(12) United States Patent
Ohba

(10) Patent No.: US 11,181,362 B2
(45) Date of Patent: Nov. 23, 2021

(54) METHOD OF MEASURING VOLUME OF MICRO PROJECTION AND METHOD OF APPLYING LIQUID MATERIAL

(71) Applicant: NTN CORPORATION, Osaka (JP)

(72) Inventor: Hiroaki Ohba, Iwata (JP)

(73) Assignee: NTN CORPORATION, Osaka (JP)

(*) Notice: Subject to any disclaimer, the term of this patent is extended or adjusted under 35 U.S.C. 154(b) by 118 days.

(21) Appl. No.: 16/069,394

(22) PCT Filed: Jan. 10, 2017

(86) PCT No.: PCT/JP2017/000477
§ 371 (c)(1),
(2) Date: Jul. 11, 2018

(87) PCT Pub. No.: WO2017/122633
PCT Pub. Date: Jul. 20, 2017

(65) Prior Publication Data
US 2019/0025047 A1    Jan. 24, 2019

(30) Foreign Application Priority Data

Jan. 13, 2016  (JP) .............................. JP2016-004464
Nov. 29, 2016  (JP) ................................. 2016-231674

(51) Int. Cl.
  *G01B 11/24*  (2006.01)
  *B05D 1/26*  (2006.01)
  (Continued)

(52) U.S. Cl.
  CPC ............ *G01B 11/2441* (2013.01); *B05D 1/26* (2013.01); *G01B 11/00* (2013.01); *G01B 11/0608* (2013.01); *G01B 11/08* (2013.01)

(58) Field of Classification Search
  CPC . G10B 11/2441; G10B 11/00; G10B 11/0608; G10B 11/08; B05D 1/26
  See application file for complete search history.

(56) References Cited

U.S. PATENT DOCUMENTS 6,139,639 A   10/2000  Kitamura et al.
8,643,847 B1   2/2014  Chen
(Continued)

FOREIGN PATENT DOCUMENTS

CN   1147215 A   4/1997
CN   1406156 A   3/2003
(Continued)

OTHER PUBLICATIONS

Eric Weisstein, archive.lib.msu.edu/crcmath/math/math/s/s570.htm, May 26, 1999; last visited Feb. 6, 2020.*
(Continued)

*Primary Examiner* — James M Mellott
(74) *Attorney, Agent, or Firm* — McDermott Will & Emery LLP

(57) ABSTRACT

A method of measuring a volume of a micro projection includes: measuring a three-dimensional shape of the micro projection using white-light interferometry; comparing a height at which a first peak of an envelope of an interference light intensity is detected with a height of a reference plane, and extracting a projection top portion of the micro projection; detecting a height of the extracted projection top portion; detecting a diameter based on a lateral dimension and a longitudinal dimension of a circumscribed quadrangle in an area that constitutes the projection top portion and a region having a height different from the height of the reference plane, the region including or being in contact with the projection top portion; and calculating the volume of the micro projection based on the height of the projection top portion and the diameter.

3 Claims, 12 Drawing Sheets

(51) Int. Cl.
*G01B 11/06* (2006.01)
*G01B 11/00* (2006.01)
*G01B 11/08* (2006.01)

(56) References Cited

U.S. PATENT DOCUMENTS

| | | |
|---|---|---|
| 2004/0065254 A1 | 4/2004 | Ikeuchi et al. |
| 2005/0168758 A1 | 8/2005 | Hayasaki et al. |
| 2010/0277742 A1* | 11/2010 | McMillan .............. G01N 21/31 356/450 |
| 2015/0362309 A1 | 12/2015 | Quaedackers |
| 2015/0362417 A1 | 12/2015 | Haberland et al. |

FOREIGN PATENT DOCUMENTS

| | | |
|---|---|---|
| CN | 1577739 A | 2/2005 |
| CN | 1649086 A | 8/2005 |
| JP | H05-248837 A | 9/1993 |
| JP | 2006-136836 A | 6/2006 |
| JP | 2007-029891 A | 2/2007 |
| JP | 2009-122259 A | 6/2009 |
| JP | 2015-007564 A | 1/2015 |
| TW | 201323822 A | 6/2013 |
| TW | 201445109 A | 12/2014 |

OTHER PUBLICATIONS

Teachingmath, http://teachingmath.info/pie.htm, Jul. 9, 2009.*
Hiroaki Oba, "3D Microgeometry Measuring Equipment", NTN Technical Review, No. 83, pp. 91-97, (Oct. 20, 2015).
Search Report issued in corresponding International Patent Application No. PCT/JP2017/000477, dated Mar. 14, 2017.
Extended European Search Report issued in corresponding European Paternt Application No. 17738387.4, dated Jul. 18, 2019.
Chinese Office Action issued in corresponding Chinese Application No. 201780006528.1, dated Nov. 29, 2019, with English translation.
Taiwanese Office Acton issued in corresponding Taiwan Patent Application No. 106100809, dated Aug. 4, 2020, with English translation.

* cited by examiner (A)

c(x, y)

(B)

f(x, y)

(C)

i(x, y)

(A)

c(x, y)

(B)

f(x, y)

(C)

i(x, y)

METHOD OF MEASURING VOLUME OF MICRO PROJECTION AND METHOD OF APPLYING LIQUID MATERIAL

CROSS REFERENCE

This application is the U.S. National Phase under 35 U.S.C. § 371 of International Application No. PCT/JP2017/000477, filed on Jan. 10, 2017, which claims the benefit of Japanese Application No. 2016-004464, filed on Jan. 13, 2016 and Japanese Application No. 2016-231674, filed on Nov. 29, 2016, the entire contents of each are hereby incorporated by reference.

TECHNICAL FIELD

The present invention relates to a method of measuring a volume of a micro projection and a method of applying a liquid material.

BACKGROUND ART

A method of detecting a height of an ink applied by an application apparatus is known. For example, according to Japanese Patent Laying-Open No. 2015-007564 (PTD 1), an application apparatus described therein positions an objective lens above an ink applied portion formed by an ink applied onto a surface of a substrate, and then, picks up an image with a Z stage being moved. For each of a plurality of pixels forming the image obtained by image pick-up, the application apparatus determines a Z stage position where a contrast value peaks, and a height of the ink applied portion based on the determined Z stage position.

CITATION LIST

Patent Document

PTD 1: Japanese Patent Laying-Open No. 2015-007564

SUMMARY OF INVENTION

Technical Problem

However, the contrast of the interference light in FIGS. 7(a), 10 and 11 of PTD 1 is high in a location such as a flat surface where the regular reflected light is obtained, and is low in a location such as an inclined surface where it is difficult to obtain the regular reflected light.

The application mechanism described in PTD 1 can apply a high viscosity ink. In the case of a high viscosity ink, a contact angle between the applied ink and a substrate is large, and thus, the regular reflected light is not obtained at an edge of the ink and no interference fringe occurs. Therefore, the height cannot be detected in some cases. The volume calculation formula described in PTD 1 is an integral value of the height of the ink applied portion and is based on the premise that the height of the entire applied portion can be detected. Therefore, when the height of a part of the applied portion cannot be detected as described above, it is difficult to calculate the volume.

Generally, a volume Vol of a spherical object can also be calculated in accordance with the following formula (1), based on a radius and a top height of the spherical object:

$$Vol = (1/6)\pi \times hp \times (3R^2 + hp^2) \quad (1)$$

where hp represents the top height, and R represents the radius. As described above, in the case of a high viscosity ink, a contact angle is large at an edge of the ink and no interference fringe occurs, and thus, the height cannot be detected in some cases. In such a case, radius R cannot be obtained and volume Vol cannot be calculated in accordance with the formula (1).

As described above, when an ink has a high viscosity and no interference fringe occurs and thus a height of an entire applied portion cannot be detected, a volume of a liquid droplet cannot be directly detected based on image data showing a three-dimensional shape as described in the patent document.

Accordingly, an object of the present invention is to provide a method of measuring a volume of a micro projection and a method of applying a liquid material, which allow calculation of a volume of a liquid droplet even when a height cannot be detected at an edge of the liquid droplet.

Solution to Problem

A method of measuring a volume of a micro projection in the present invention includes: measuring a three-dimensional shape of the micro projection using white-light interferometry; comparing a height at which a first peak of an envelope of an interference light intensity is detected with a height of a reference plane, and extracting a portion higher than the reference plane as a projection top portion of the micro projection; detecting a height of the extracted projection top portion; detecting, as a diameter, any one of a lateral dimension, a longitudinal dimension, and an average of the lateral dimension and the longitudinal dimension of a circumscribed quadrangle in an area that constitutes the projection top portion and a region having a height different from the height of the reference plane, the region including or being in contact with the projection top portion; and calculating the volume of the micro projection based on the height of the projection top portion and the diameter.

Preferably, the region having the height different from the height of the reference plane is a height-undetected portion including or being in contact with the projection top portion.

Preferably, the region having the height different from the height of the reference plane is a height-detected portion lower than the reference plane, the height-detected portion including the projection top portion.

Preferably, the detecting the height includes detecting a maximum height of the projection top portion as the height of the projection top portion.

Preferably, the detecting the height includes detecting, as the height of the projection top portion, an average height or a median value of a highest portion of the projection top portion and a portion near the highest portion.

Preferably, the micro projection is a liquid droplet adhering to a substrate.

Preferably, the liquid droplet is formed on the substrate by any one of an application needle, an ink jet and a dispenser.

A method of applying a liquid material in the present invention is an application method by causing a liquid material to adhere to a tip portion of an application needle, positioning the application needle at a predetermined position above an object, moving down and up the application needle and applying the liquid material onto the object, to form a liquid material layer made of the liquid material. The method of applying a liquid material includes: measuring a three-dimensional shape of a micro projection using white-light interferometry; comparing a height at which a first peak of an envelope of an interference light intensity is detected with a height of a reference plane, and extracting a portion higher than the reference plane as a projection top portion of the micro projection; detecting a height of the extracted projection top portion; detecting, as a diameter, any one of a lateral dimension, a longitudinal dimension, and an average of the lateral dimension and the longitudinal dimension of a circumscribed quadrangle in an area that constitutes the projection top portion and a height-undetected portion including or being in contact with the extracted projection top portion or a height-detected portion lower than the reference plane, the height-detected portion including the detected projection top portion; calculating a volume of the micro projection based on the height of the projection top portion and the diameter; and when the volume calculated in the calculating the volume of the micro projection is smaller than a threshold value, repeatedly applying the liquid material until the number of times of application exceeds the specified number of times.

Advantageous Effects of Invention

According to the present invention, a volume of a liquid droplet can be calculated even when a height cannot be detected at an edge of the liquid droplet.

DESCRIPTION OF EMBODIMENTS

An embodiment of the present invention will be described hereinafter with reference to the drawings.

[Overall Configuration]

Figure 1:
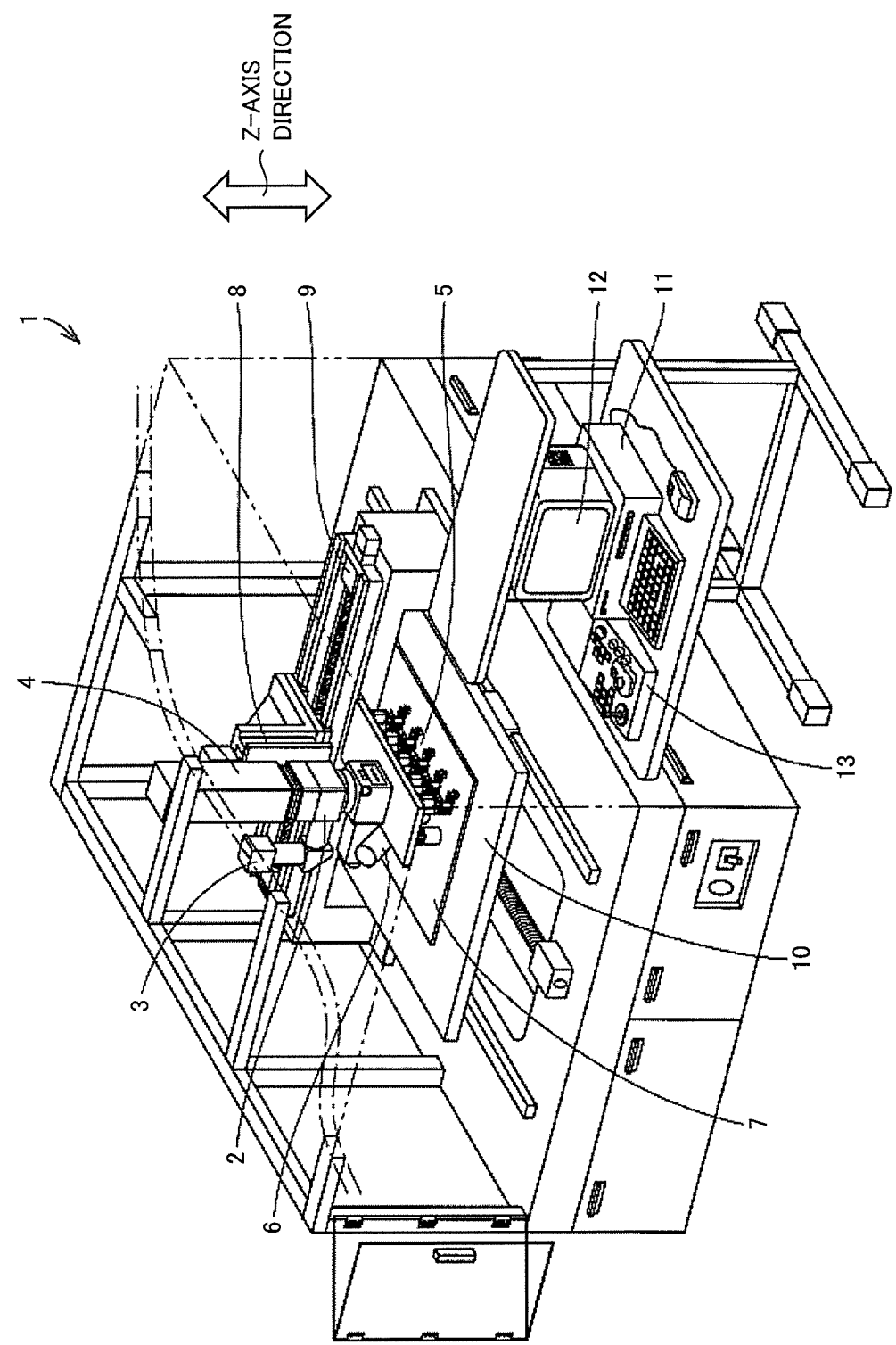
FIG. 1 is a perspective view showing an overall configuration of a microscopic application apparatus 1 including the function of measuring a volume of a liquid droplet as a typical example of an embodiment of the present invention.

FIG. 1 is a perspective view showing an overall configuration of a microscopic application apparatus 1 including the function of measuring a volume of a liquid droplet as a typical example of an embodiment of the present invention.

Referring to FIG. 1, microscopic application apparatus 1 includes: an application head portion composed of an observation optical system 2, a CCD (Charge-Coupled Device) camera 3, a cutting laser device 4, an ink application mechanism 5, and a light source for ink curing 6; a Z stage 8 configured to move the application head portion in a vertical direction (Z-axis direction) with respect to a substrate 7 to be coated; an X stage 9 configured to have Z stage 8 mounted thereon and move Z stage 8 in an X-axis direction; a Y stage 10 configured to have substrate 7 mounted thereon and move substrate 7 in a Y-axis direction; a control computer 11 configured to control the total operation of microscopic application apparatus 1; a monitor 12 configured to display an image and the like taken by CCD camera 3; and an operation panel 13 through which a command from an operator is input to control computer 11.

Observation optical system 2 includes a light source for lighting and observes a surface state of substrate 7 and a state of an ink applied by ink application mechanism 5. An image observed by observation optical system 2 is converted to an electric signal by CCD camera 3 and displayed on monitor 12. Cutting laser device 4 irradiates substrate 7 with a laser beam through observation optical system 2 to remove a metal film and the like.

Ink application mechanism 5 applies an ink onto substrate 7 to form an electrode and the like. Light source for ink curing 6 includes, for example, a $CO_2$ laser and irradiates the ink applied by ink application mechanism 5 with a laser beam to cure the ink.

The configuration of microscopic application apparatus 1 is one example, and microscopic application apparatus 1 may have, for example, a configuration called "gantry style" in which Z stage 8 having observation optical system 2 and the like mounted thereon is mounted on X stage 9 and further X stage 9 is mounted on Y stage 10 and Z stage 8 is movable in an X-Y direction. Microscopic application apparatus 1 may have any configuration as long as Z stage 8 having observation optical system 2 and the like mounted thereon is movable in the X-Y direction relative to substrate 7.

Figure 2:
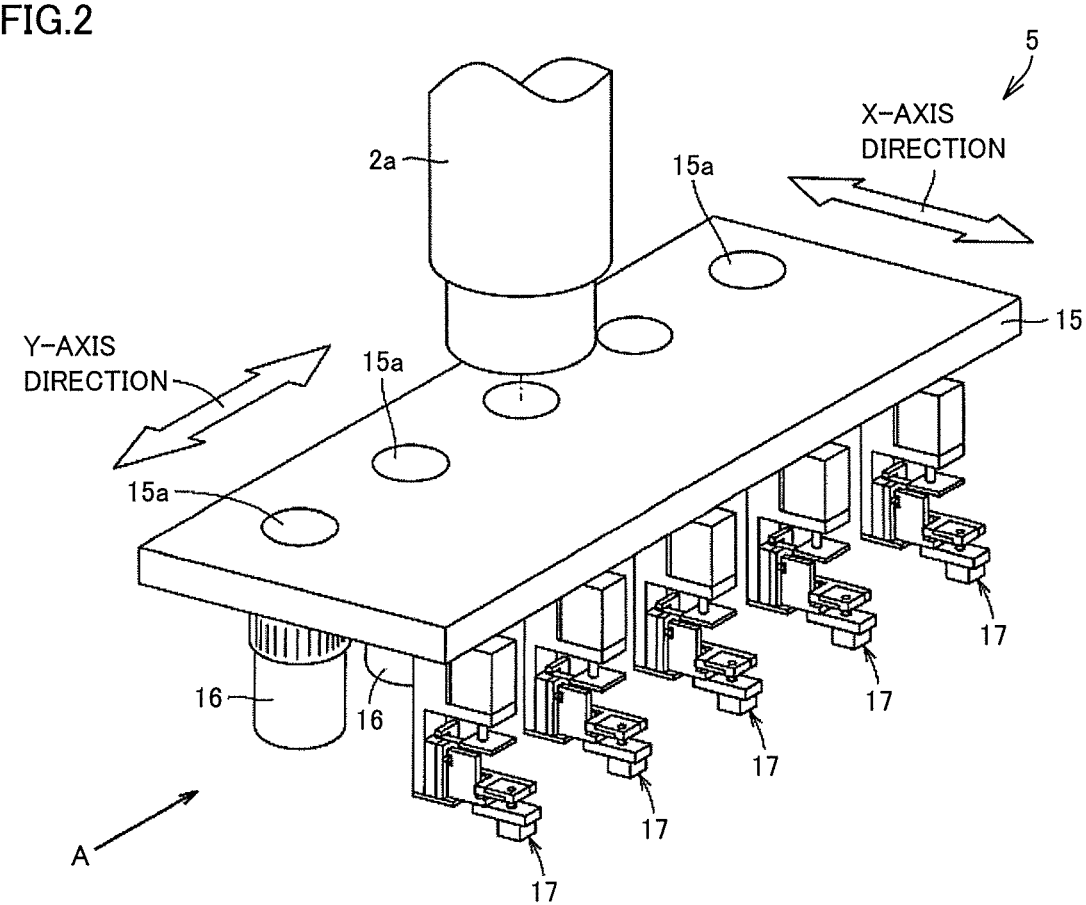
FIG. 2 is a perspective view showing a main portion of an observation optical system 2 and an ink application mechanism 5.

Next, an example of ink application mechanism 5 including a plurality of application needles 18 will be described. FIG. 2 is a perspective view showing a main portion of observation optical system 2 and ink application mechanism 5. Referring to FIG. 2, observation optical system 2 and ink application mechanism 5 include a movable plate 15, a plurality of (e.g., five) objective lenses 16 having different magnifications, and a plurality of (e.g., five) application units 17 for applying inks of different colors.

Movable plate 15 is provided so as to be movable in the X-axis direction and in the Y-axis direction between a lower end of an observation lens barrel 2a of observation optical system 2 and substrate 7. In addition, five through holes 15a corresponding to five objective lenses 16, respectively, are formed in movable plate 15.

Five through holes 15a are fixed to a lower surface of movable plate 15 at prescribed intervals in the Y-axis direction. Five application units 17 are arranged so as to be adjacent to five objective lenses 16, respectively. By moving movable plate 15, desired application unit 17 can be arranged above an application position.

Figure 3:
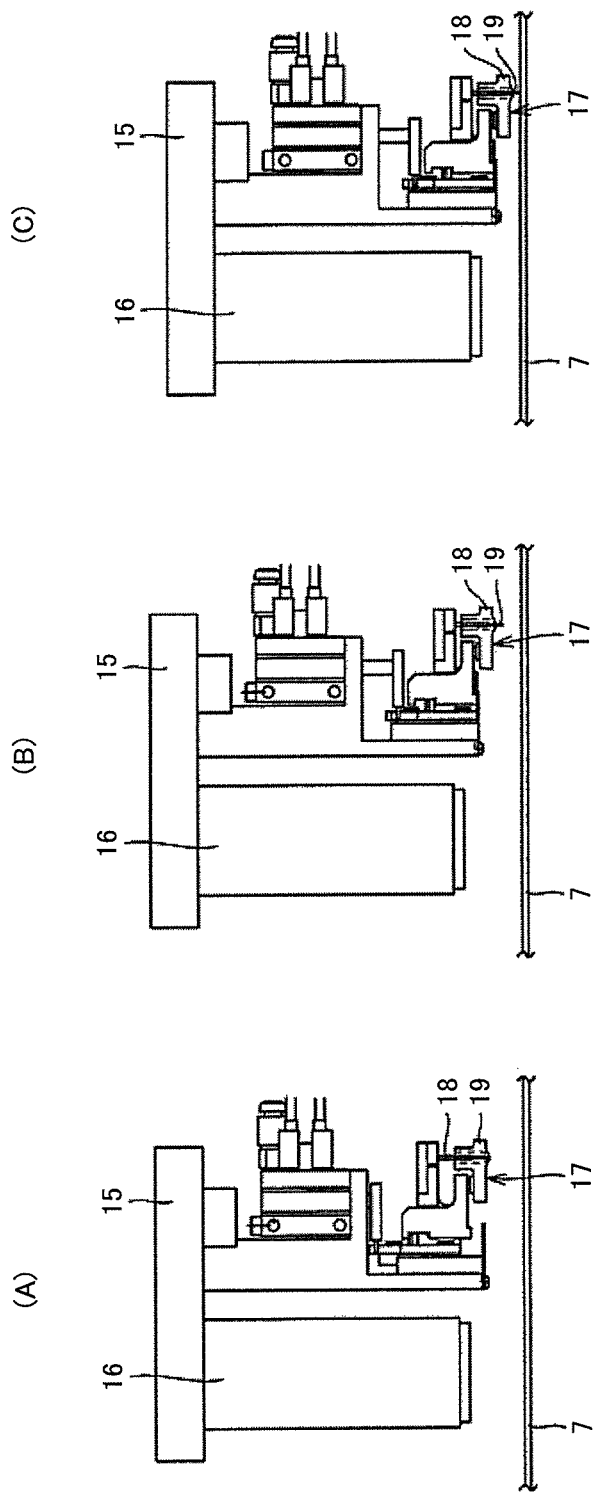
FIGS. 3(A) to (C) show the main portion when viewed from an A direction in FIG. 2.

FIGS. 3(A) to (C) show the main portion when viewed from an A direction in FIG. 2, and show the ink application operation.

Application unit 17 includes application needle 18 and an ink tank 19.

First, as shown in FIG. 3(A), application needle 18 of desired application unit 17 is positioned above the application position. At this time, a tip portion of application needle 18 is immersed in an ink in ink tank 19.

Next, as shown in FIG. 3(B), application needle 18 is moved down, such that the tip portion of application needle 18 protrudes from a hole of a bottom of ink tank 19. At this time, the tip portion of application needle 18 has the ink adhering thereto.

Next, as shown in FIG. 3(C), application needle 18 and ink tank 19 are moved down to bring the tip portion of application needle 18 into contact with the application position, and the ink is thereby applied.

Thereafter, the main portion returns to the state shown in FIG. 3(A).

In addition to the foregoing, various techniques of ink application mechanism 5 including the plurality of application needles 18 are known, and thus, a detailed description will not be repeated. These techniques are described in, for example, Japanese Patent Laying-Open No. 2009-122259 and the like. Microscopic application apparatus 1 can apply a desired ink of the plurality of inks by using, for example, the mechanism shown in FIG. 2 as ink application mechanism 5, and can apply the ink by using application needle 18 having a desired application diameter, of the plurality of application needles 18.

A description has been given of the example in which the function of measuring a volume of a liquid droplet is integrally incorporated into the microscopic application apparatus including application needles 18. However, other mechanisms such as, for example, an ink jet and a dispenser can also be used as a mechanism for applying a microscopic liquid droplet. In addition, as the function of measuring a volume of a projection having a shape that forms a part of an almost sphere, the present invention may be incorporated into a three-dimensional shape measuring apparatus and the like using two-beam interference. Furthermore, as long as a projection has a shape that forms a part of an almost sphere, the present invention is applicable not only to the liquid droplet but also to a solid projection such as a microlens.

In addition, although ink application mechanism 5 including the plurality of application needles 18 in FIG. 2 is used in microscopic application apparatus 1 according to the present embodiment, the present invention is not limited to the ink application mechanism in FIG. 2 and the means such as a dispenser and an ink jet that can apply a liquid material in a spherical form may be used.

[Principle of Detecting Height]

Next, the principle of detecting a height of a liquid droplet will be described.

A Mirau-type interference objective lens 39 is one type of two-beam interference objective lens. By utilizing the characteristic that the interference light intensity is maximized at a focal position of Mirau-type interference objective lens 39, an image of the interference light is obtained, with Z stage 8 being moved in the Z-axis direction relative to substrate 7.

For each pixel of a plurality of images, a position of Z stage 8 in the Z-axis direction where the interference light intensity is maximized is determined, to thereby detect a height of a liquid droplet. This method of measuring the height is suitable for detecting a micro height of not more than several micrometers.

Mirau-type interference objective lens 39 separates the white light emitted from the light source for lighting included in observation optical system 2 into two beams, and irradiates a surface of an object with one of the two beams and irradiates a reference plane with the other beam, to thereby cause the light reflected from the surface of the object and the light reflected from the reference plane to interfere with each other.

A white light source is used as the light source for lighting included in observation optical system 2. In the case of using the white light source, the interference light intensity is maximized only at a focal position of Mirau-type interference objective lens 39, unlike the case of using a single wavelength light source such as a laser. Therefore, the white light source is suitable for measuring a height of a liquid droplet.

Figure 4:
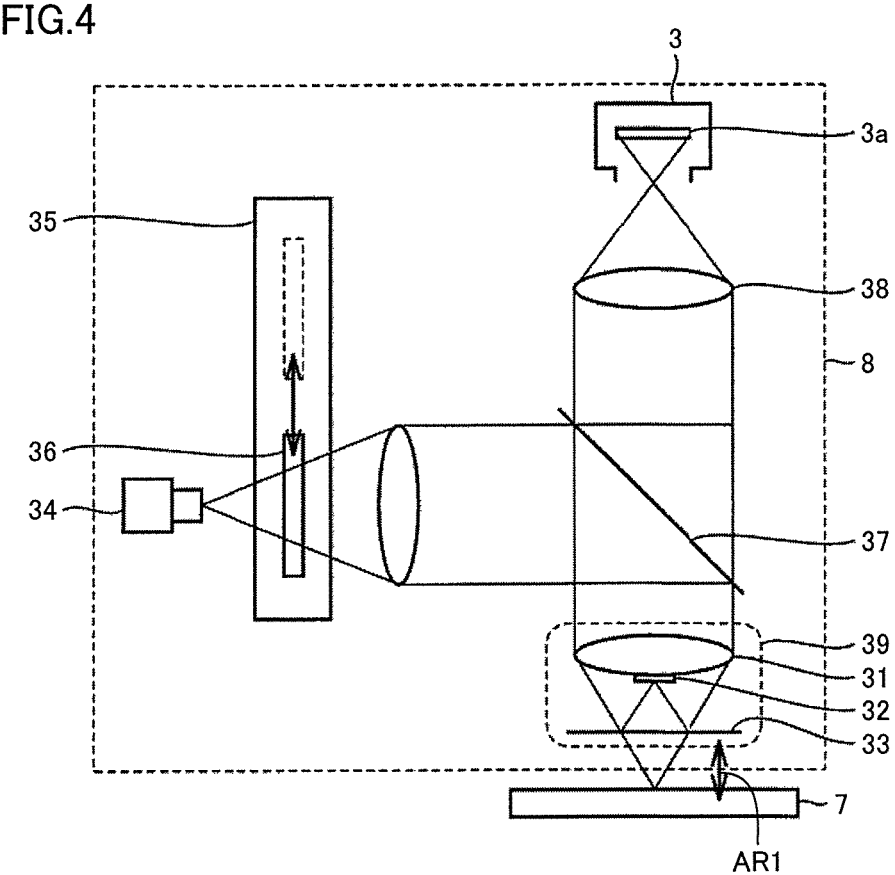
FIG. 4 is an arrangement diagram of optical elements of observation optical system 2.

FIG. 4 is an arrangement diagram of optical elements of observation optical system 2. Mirau-type interference objective lens 39 includes a lens 31, a reference mirror 32 and a beam splitter 33.

A filter 36 is provided in an emission portion of incident light source 34 by a filter switching device 35.

When the light emitted from incident light source 34 passes through filter 36, the white light having a center wavelength of $\lambda$ (nm) is obtained.

The light having passed through filter 36 is reflected in a direction of lens 31 by a half mirror 37. The light having entered lens 31 is divided by beam splitter 33 into the light passing in a direction of substrate 7 and the light reflected in a direction of reference mirror 32. The light reflected from a surface of substrate 7 and the light reflected from a surface of reference mirror 32 join again in beam splitter 33 and are gathered by lens 31. Thereafter, the light having exited from lens 31 passes through half mirror 37, and then, enters an image pick-up surface 3a of CCD camera 3 through an image-forming lens 38.

Normally, Mirau-type interference objective lens 39 is moved in an optical axis direction using Z stage 8, to thereby generate an optical path length difference between the light reflected from the surface of substrate 7 and the light reflected from the surface of reference mirror 32. Then, an image of the interference light generated due to the above-described optical path length difference is picked up by CCD camera 3, with Mirau-type interference objective lens 39 being moved by Z stage 8. The intensity of this interference light, i.e., brightness is maximized when the optical path length of the light reflected from substrate 7 is equal to the optical path length of the light reflected from reference mirror 32. In addition, the surface of substrate 7 is put into focus at this time.

In addition to Z stage 8, substrate 7 itself may be moved up and down using the table, or a piezo table may be attached to a coupling portion of Mirau-type interference objective lens 16 and observation optical system 2 to thereby move up and down the position of Mirau-type interference objective lens 39.

Although the Mirau-type interference objective lens is used in the present embodiment, a Michelson-type or Riniku-type interference objective lens may be used.

[Process for Measuring Volume]

Figure 5:
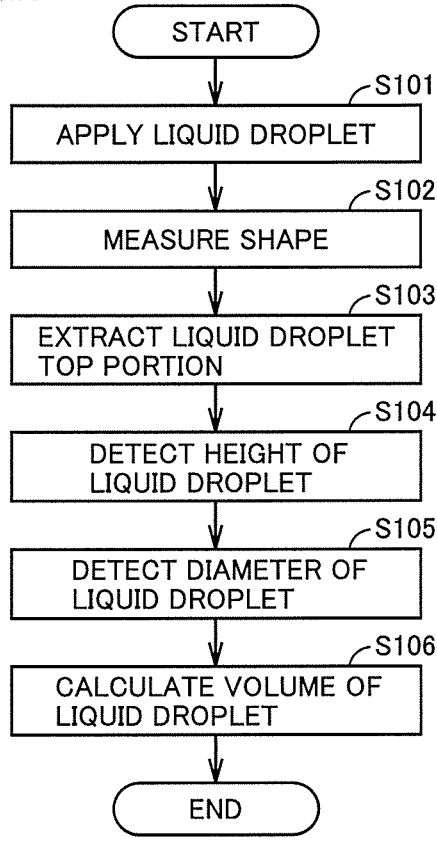
FIG. 5 is a flowchart showing a procedure for measuring the volume of the liquid droplet in the embodiment of the present invention.

FIG. 5 is a flowchart showing a procedure for measuring a volume of a liquid droplet in the embodiment of the present invention. Each step in this flowchart is performed under control of control computer 11.

In step S101, a liquid material having adhered to the tip of application needle 18 is applied onto substrate 7 and a liquid droplet is applied. Specifically, the liquid material having adhered to the tip of application needle 18 is applied onto substrate 7 by ink application mechanism 5 of microscopic application apparatus 1 in FIG. 1.

In step S102, a three-dimensional shape of the liquid droplet is measured using white-light interferometry. Specifically, an image of the interference light is picked up by CCD camera 3, with Mirau-type interference objective lens 39 being moved in the optical axis direction by Z stage 8, to thereby obtain a plurality of images. For each pixel in the plurality of images, a position of Z stage 8 where the interference light intensity peaks is determined, to thereby detect a height of the liquid droplet.

Z stage 8 moves in the Z-axis direction at a predetermined speed v (μm/sec). The movement direction of the Z stage is shown by an arrow AR1 in FIG. 4, and a direction of moving away from substrate 7 is defined as + direction and a direction of coming closer to substrate 7 is defined as − direction. Herein, Z stage 8 is moved in the direction of coming closer to substrate 7 (− direction) from above substrate 7. Speed v (μm/sec) of Z stage 8 is set as follows. A center wavelength of the white light is represented by λ (μm) and a frequency of a vertical synchronization signal of CCD camera 3 is represented by f (Hz). Then, movement speed v (μm/sec) is set such that Z stage 8 moves by λ/8 (m) during an image sampling cycle 1/f (sec). That is, movement speed v of Z stage 8 is expressed as v=(λ/8)×f (μm/sec). This movement speed v corresponds to a phase increment of the white light of π/2. By changing the phase in increments of π/2, a modulation contrast mi(x, y) of the interference light in a (x, y) coordinate can be calculated in accordance with the formula (2):

$$m_i = \sqrt{\frac{\{g_{i-1}(x, y) - g_{i+1}(x, y)\}^2 + \{g_{i-2}(x, y) - g_i(x, y)\}\{g_i(x, y) - g_{i+2}(x, y)\}}{2}}. \quad (2)$$

Figure 6:
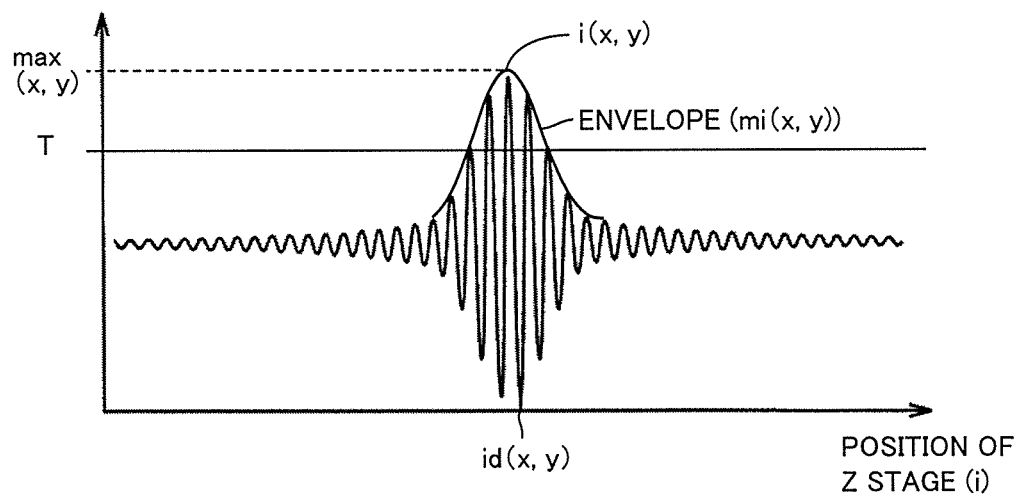
FIG. 6 shows an envelope of the interference light intensity.

In the formula (2), i represents a frame number (image number). i is set to be not less than 1 and not more than ISIZE. That is, an image of the first frame to an image of the (ISIZE) frame are obtained.

gi(x, y) represents a pixel value, at the position (x, y), of an image Gi of the i frame taken by CCD camera 3. This pixel value indicates a luminance, at the position (x, y), of corresponding image pick-up surface 3a of the CCD camera, and corresponds to the interference light intensity. In addition, modulation contrast mi(x, y) corresponds to an envelope of the interference light intensity as shown in FIG. 6. x represents a position of the pixel in the X-axis direction, and y represents a position of the pixel in the Y-axis direction. x is set to be not less than 1 and not more than XSIZE. y is set to be not less than 1 and not more than YSIZE.

Since a peak of this envelope matches with a peak of the interference light intensity, the peak of the envelope is determined in step S102. However, when the ink is transparent, the interference light caused by the light reflected from a rear surface of the ink is detected and the intensity of this interference light may in some cases be higher than the intensity of the interference light caused by the light reflected from a front surface of the ink, and thus, the position of Z stage 8 at the first detected peak of the envelope is determined.

Now, modulation contrast mi(x, y) at the position (x, y) is represented by a maximum value max(x, y). In addition, the number of times that does not continuously satisfy mi(x, y)>max(x, y) in step S206 described below is represented by cnt(x, y).

An image in which the pixel value of the pixel (x, y) takes maximum value max(x, y) is defined as a contrast maximum image MAX.

A frame number i when modulation contrast mi(x, y) shows the maximum value in the pixel (x, y) is represented by id(x, y). An image in which the pixel value of the pixel (x, y) takes id(x, y) is defined as a frame number image ID.

In addition, f(x, y)=1 is set when the peak is detected at the position (x, y), and f(x, y)=0 is set when the peak is not detected at the position (x, y). An image in which the pixel value of the pixel (x, y) takes f(x, y) is defined as a detected identification image F.

Figure 7:
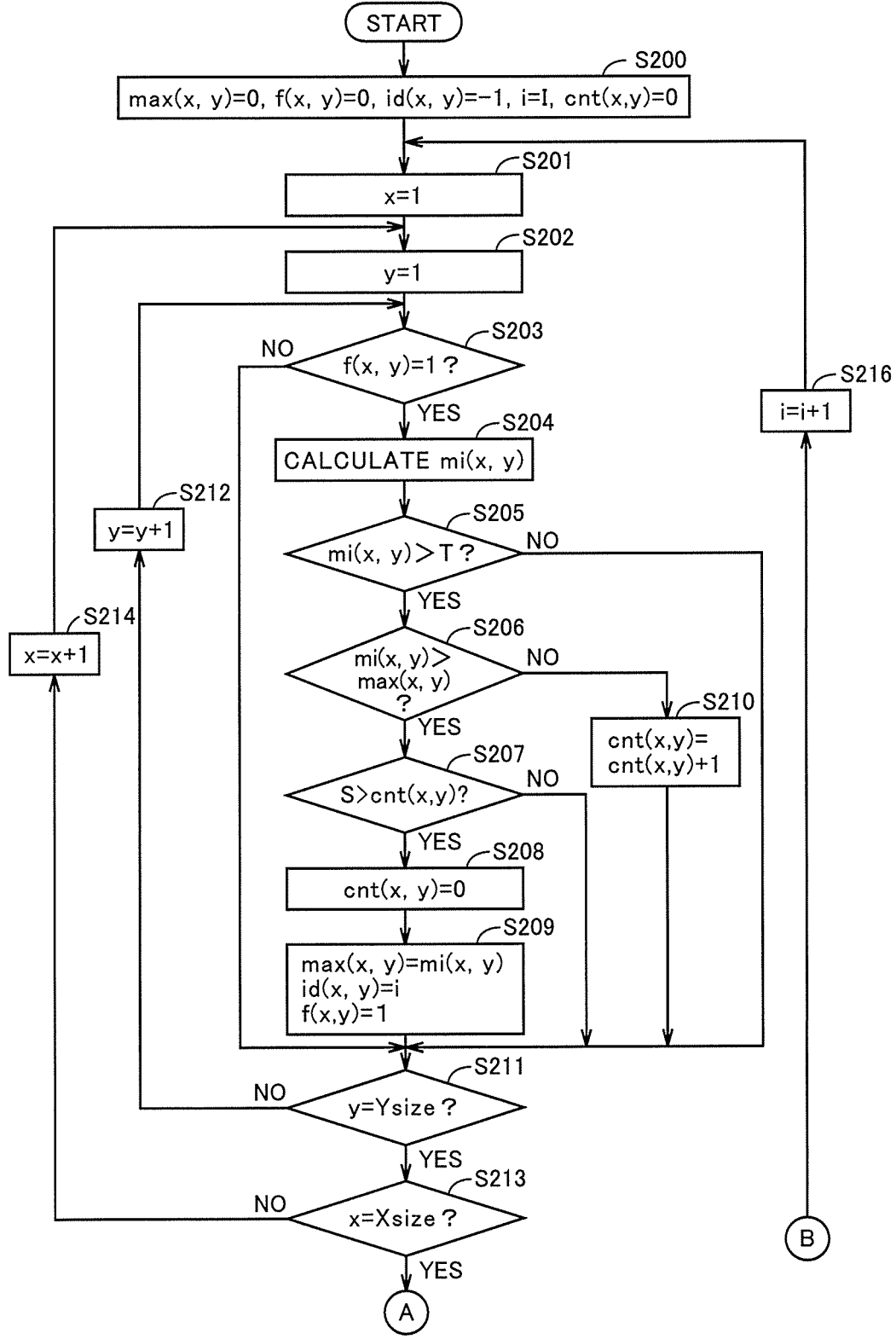
FIG. 7 is a flowchart showing a procedure for determining a position (height) of a Z stage 8 where the interference light intensity peaks, using a modulation contrast mi(x, y).
Figure 8:
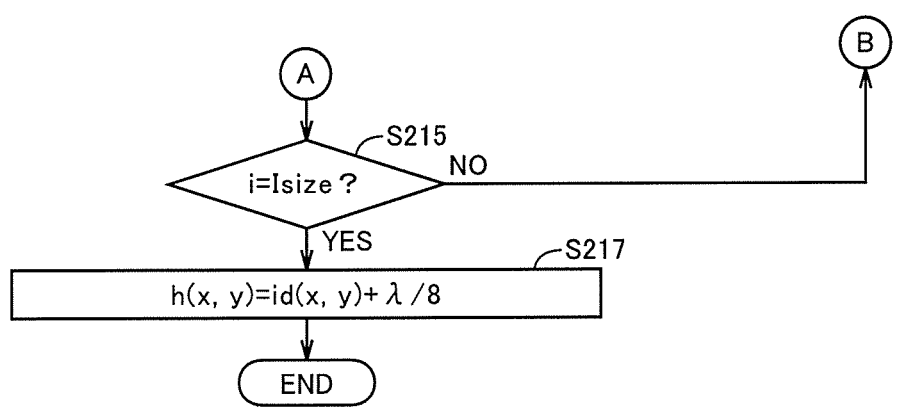
FIG. 8 is a flowchart showing a procedure for determining a position (height) of Z stage 8 where the interference light intensity peaks, using modulation contrast mi(x, y).

FIGS. 7 and 8 are flowcharts showing a procedure for determining a position (height) of Z stage 8 where the interference light intensity peaks, using modulation contrast mi(x, y).

In step S200, for all x and y satisfying 1≤x≤XSIZE and 1≤y≤YSIZE, max(x, y)=0, cnt(x, y)=0, f(x, y)=0, and id(x, y)=−1 are set and i is set at 1.

In step S201, x is set at 1.

In step S202, y is set at 1.

In step S203, the process proceeds to step S204 when f(x, y)=1 is satisfied, and the process proceeds to step S211 when f(x, y)=0 is satisfied.

In step S204, modulation contrast mi(x, y) is calculated in accordance with the formula (2).

In step S205, the process proceeds to step S206 when mi(x, y) is larger than a prescribed threshold value T, and the process proceeds to step S211 when mi(x, y) is equal to or smaller than prescribed threshold value T.

In step S206, the process proceeds to step S207 when mi(x, y)>max(x, y) is satisfied, and the process proceeds to step S210 when mi(x, y)≤max(x, y) is satisfied.

In step S207, when S>cnt(x, y) is not satisfied, the process proceeds to step S211 and max(x, y) is not updated. That is, maximum value max(x, y) of the pixel (x, y) is confirmed.

In step S207, when S≤cnt(x, y) is satisfied, the process proceeds to step S208.

In step S208, cnt(x, y)=0 is set, and then, the process proceeds to step S209.

In step S209, max(x, y) is set at the value of mi(x, y), id(x, y) is set at the value of i, and f(x, y) is set at 1.

In step S210, cnt(x, y) is incremented by 1, and then, the process proceeds to step S211.

In step S211, the process proceeds to step S212 when y=YSIZE is satisfied, and the process proceeds to step S213 when y=YSIZE is not satisfied.

In step S212, y is incremented by 1. Thereafter, the process returns to step S203.

In step S213, the process proceeds to step S215 when x=XSIZE is satisfied, and the process proceeds to step S214 when x=XSIZE is not satisfied.

In step S214, x is incremented by 1. Thereafter, the process returns to step S202.

In step S215, the process proceeds to step S217 when i=ISIZE is satisfied, and the process proceeds to step S216 when i=ISIZE is not satisfied.

In step S216, i is incremented by 1. Thereafter, the process returns to step S201.

As a result of the above-described process, modulation contrast mi(x, y) of the first detected peak of the envelope is stored in the pixel (x, y) satisfying f(x, y)=1, of contrast maximum image MAX. Number id(x, y) of the first detected peak of the envelope is stored in frame number image ID.

In step S217, with a position of Z stage 8 when an image having frame number i of "1" is obtained being the point of origin, a position (height) h(x, y) of Z stage 8 where the interference light intensity is maximized is calculated in accordance with id(x, y)×λ/8 (μm). An image in which the pixel value of the pixel (x, y) takes height h(x, y) is defined as a height image H.

Referring again to FIG. 5, in step S103, a height at which the first intensity peak of the interference light is detected is compared with a reference plane, and a liquid droplet top portion is thereby extracted.

Figure 9:
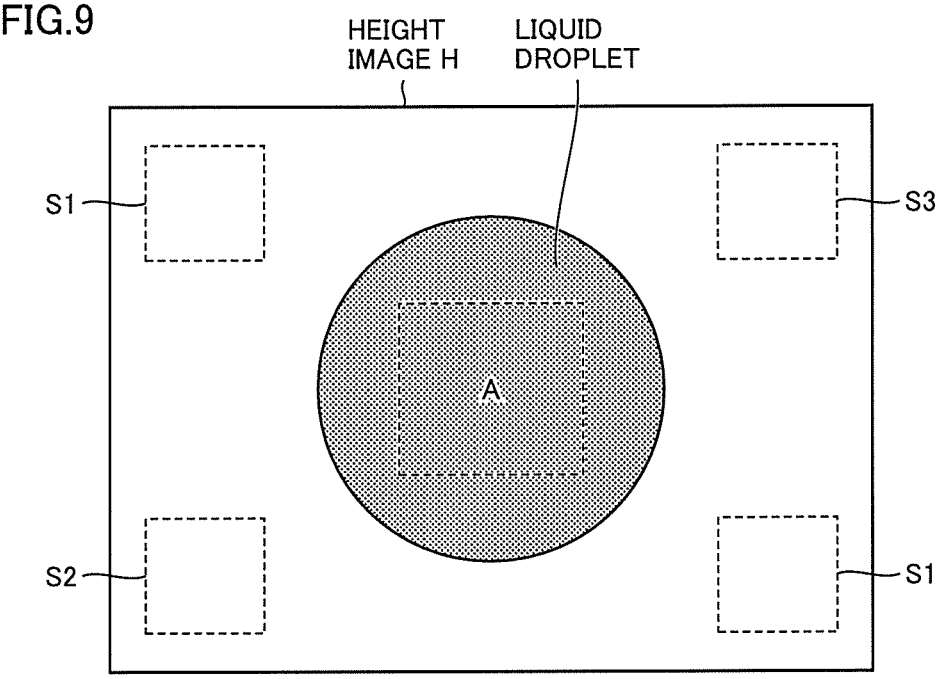
FIG. 9 shows N areas Si (i=1 to N) forming a reference plane in a height image H and an area A including a liquid droplet top.

Specifically, as shown in FIG. 9, N areas forming the reference plane in height image H is represented by Si (i=1 to N), and an area including the liquid droplet top is represented by A. Area A and areas Si (i=1 to N) are predetermined by the operator with reference to the image displayed on monitor 12, and coordinate values thereof are stored in control computer 11.

Figure 11:
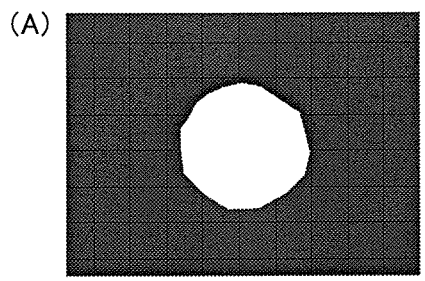
FIGS. 11(A) to (C) show an image C, an image F and an image I.
Figure 11:
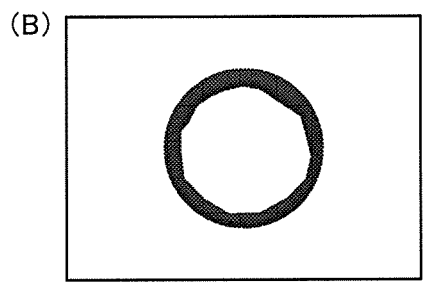
Figure 11:
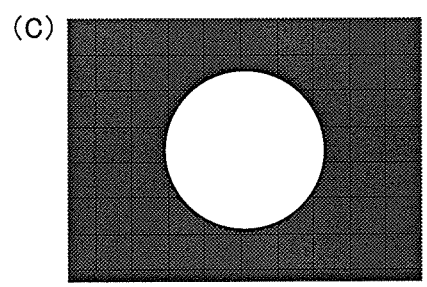

Control computer 11 extracts the pixels satisfying f(x, y)=1 from the pixels included in areas S1 to SN, and calculates an average value of heights h(x, y) of the extracted pixels as an average height havg of the reference plane. In addition, control computer 11 extracts the pixels satisfying f(x, y)=1 from the pixels included in area A, and extracts the pixels whose heights h(x, y) satisfy h(x, y)>havg+Δh as the liquid droplet top portion. The extracted liquid droplet top portion is shown in FIG. 11(A). Δh is a value prestored in control computer 11 and adjusted so as to allow extraction of the liquid droplet top portion by a preliminary test and the like.

In step S104, a height of a top of the liquid droplet top portion extracted in step S103 is detected.

Figure 10:
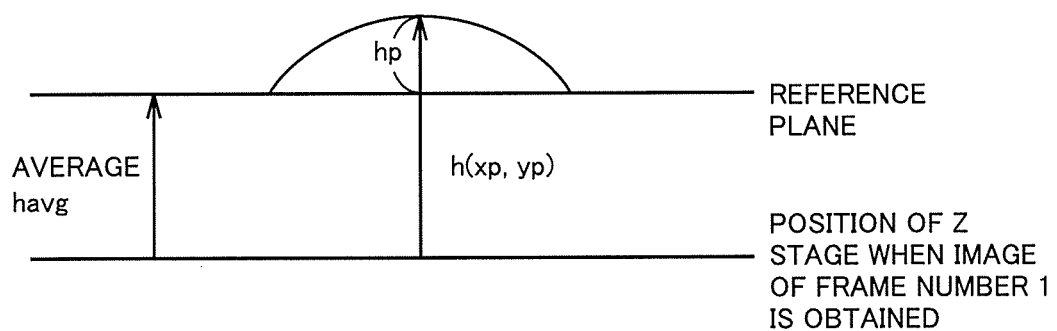
FIG. 10 shows a top height hp of the liquid droplet.

Specifically, control computer 11 extracts a pixel (xp, yp) having maximum h(x, y) as the top, of the pixels of the liquid droplet top portion extracted in step S103, and subtracts average height havg of the reference plane from a height h(xp, yp) as shown in FIG. 10, to thereby calculate a top height hp.

In step S105, an average of a lateral dimension and a longitudinal dimension of a circumscribed quadrangle in an area is detected as a diameter, the area constituting the liquid droplet top portion and an unmeasured portion including or being in contact with the liquid droplet top portion.

Specifically, control computer 11 creates an image C shown in FIG. 11(A). A pixel value c(x, y) of image C at the position (x, y) is set at "1" when height h(x, y) of the pixel (x, y) satisfies h(x, y)>havg+Δh (Δh>0), and is otherwise set at "0".

In addition, control computer 11 sets a pixel value f(x, y) of an image F shown in FIG. 11(B) at "1" when modulation contrast mi of the pixel (x, y) exceeds threshold value T, and otherwise sets pixel value f(x, y) at "0".

Figure 13:
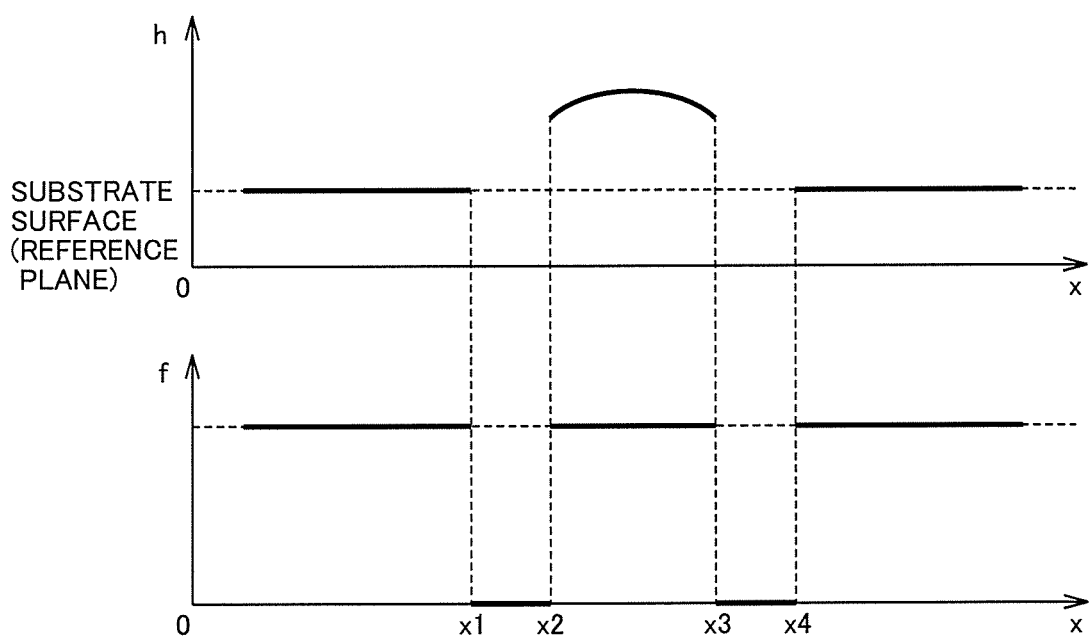
FIG. 13 is a diagram for illustrating a pixel value f(x, y) and a pixel height h(x, y) in a liquid droplet outer circumferential portion.

The process when modulation contrast mi falls below threshold value T with regard to image F will now be described with reference to FIG. 13. In FIG. 13, the horizontal axis represents an x coordinate of a pixel, and the vertical axis in the upper part represents pixel height h(x, y) and the vertical axis in the lower part represents pixel value f(x, y).

An outer circumferential portion of the liquid droplet having a cross section shown in FIG. 10 that comes into contact with the substrate has a high ink surface tension, and has a higher curvature than that of a liquid droplet central portion. Most of the light applied to the location having a high curvature is not reflected in the optical axis direction of the objective lenses, and thus, a generated interference fringe has low contrast.

Therefore, in the outer circumferential portion of the liquid droplet, modulation contrast mi falls below threshold value T, and pixel value f(x, y) is "0" as shown in a section x1 to x2 and a section x3 to x4 in FIG. 13. As a result, in the outer circumferential portion indicated by the section x1 to x2 and the section x3 to x4, pixel height h is not obtained as shown in the upper part in FIG. 13.

In FIG. 13, x1 and x4 can be regarded as a position where the liquid droplet comes into contact with the substrate, i.e., the outer circumference of the liquid droplet. Therefore, a distance between x1 and x4 corresponds to diameter D of the liquid droplet.

Control computer 11 creates an image I shown in FIG. 11(C), using image C shown in FIG. 11(A) and image F shown in FIG. 11(B).

A pixel value i(x, y) of image I at the position (x, y) is set at "1" when c(x, y)=1 is satisfied or when c(x, y)=0 and f(x, y)=0 are satisfied, and is otherwise set at "0". In FIGS. 11(A) to (C), the pixels having the pixel value of "1" are indicated by white color and the pixels having the pixel value of "0" are indicated by black color.

Control computer 11 couples the pixels having the pixel value of "1" in image I and obtains a circumscribed quadrangle thereof. Control computer 11 calculates an average value of a lateral dimension H of the circumscribed quadrangle and a longitudinal dimension V of the circumscribed quadrangle as diameter D.

Figure 12:
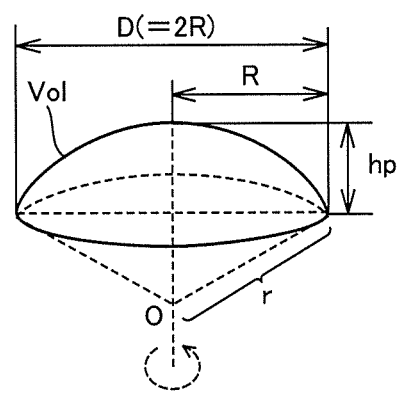
FIG. 12 shows a volume Vol of the liquid droplet, top height hp of the liquid droplet, and a radius R of the liquid droplet.

In step S106, volume Vol of the liquid droplet, top height hp of the liquid droplet and radius R (=D/2) of the liquid droplet have a relation shown in FIG. 12, and thus, control computer 11 substitutes top height hp detected in step S104 and radius R calculated from diameter D detected in step S105 into the formula (1), to thereby calculate volume Vol of the liquid droplet:

$$\text{Vol}=(1/6)\pi \times hp \times (3R^2 + hp^2) \qquad (1).$$

When the formula (1) is expressed using diameter D, the formula (1) can be expressed like the following formula (2), using the relation of R=D/2:

$$\text{Vol}=(1/6)\pi \times hp \times \{(3/4)D^2 + hp^2\} \qquad (2).$$

As described above, according to the present embodiment, even when the height cannot be detected because a contact angle is large at an edge of the ink and no interference fringe occurs due to a high viscosity ink, diameter D can be obtained. Therefore, the volume of the liquid droplet of the ink can be calculated.

Figure 14:
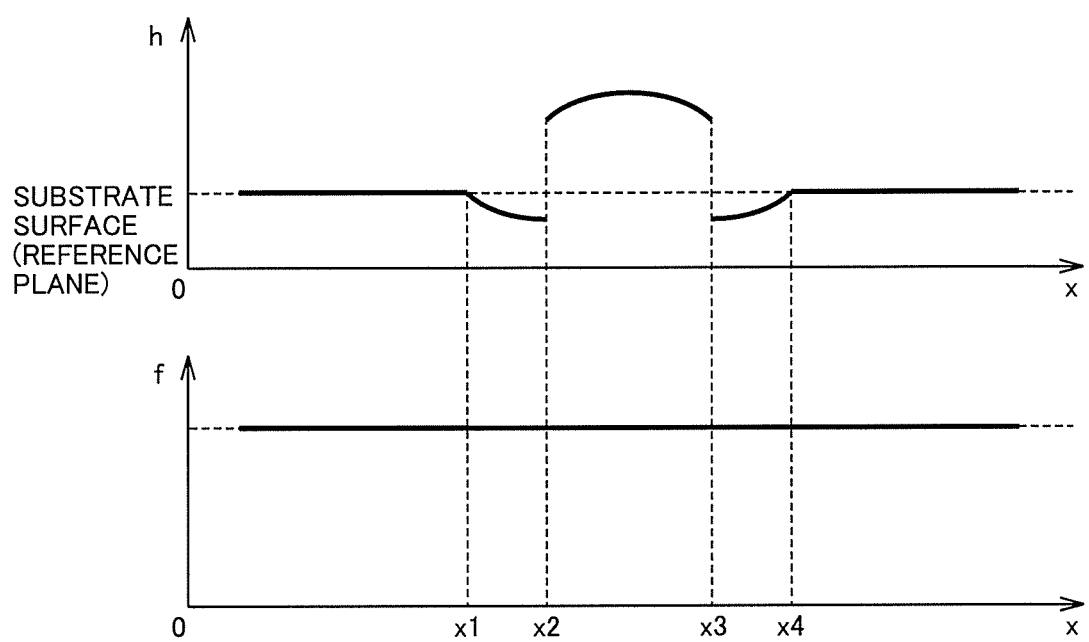
FIG. 14 is a diagram for illustrating pixel value f(x, y) and pixel height h(x, y) in the liquid droplet outer circumferential portion when a surface of a substrate has a high reflectivity.

When the substrate is made of a metal having a high reflectivity and the like, the light transmitted through the liquid droplet and reflected from the rear surface (i.e., substrate surface) is strong. Therefore, in the section x1 to x2 and the section x3 to x4 shown in FIG. 13 as well, the interference fringe may have high contrast. In such a case, pixel value f(x, y) and pixel height h(x, y) in the cross section of the liquid droplet is as shown in FIG. 14. That is, in the section x1 to x2 and the section x3 to x4 as well, modulation contrast mi exceeds threshold value T and f(x, y)=1 is satisfied, and thus, the pixel height can be obtained.

However, a distance of the light traveling through the liquid droplet is generally longer than a distance of the light traveling in the air due to an influence of a refractive index of the ink. Therefore, the pixel height in the section x1 to x2 and the section x3 to x4 is detected to be lower than the actual height of the substrate surface (reference plane) as shown in the upper part in FIG. 14. In such a case, diameter D of the liquid droplet is calculated using the method described below.

Figure 15:
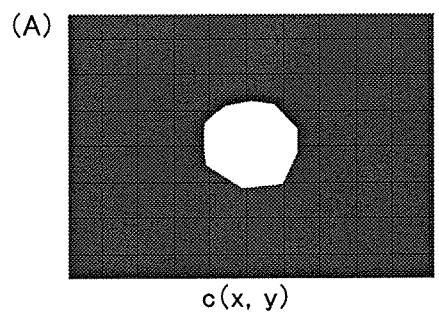
FIGS. 15(A) to (C) show an image C, an image F and an image I.
Figure 15:
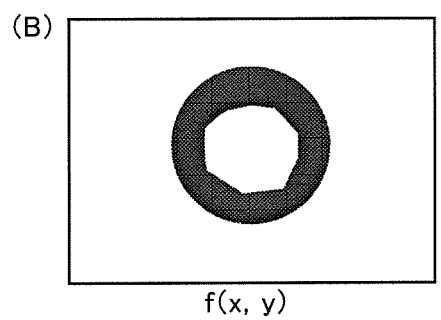
Figure 15:
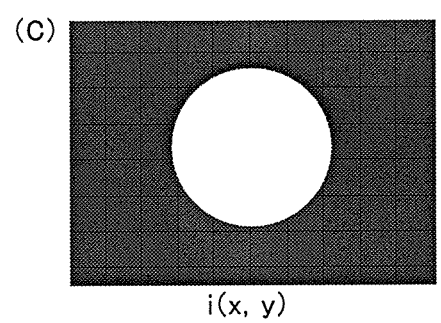

Specifically, control computer 11 creates an image C shown in FIG. 15(A). A pixel value c(x, y) of image C at the position (x, y) is set at "1" when height h(x, y) of the pixel (x, y) satisfies h(x, y)>havg+Δh (Δh>0), and is otherwise set at "0".

As to an image F shown in FIG. 15(B), a pixel value f(x, y) is changed to 0 when pixel value f(x, y) satisfies f(x, y)=1 and pixel height h(x, y) satisfies h(x, y)<havg−Δh2 (Δh2>0). Δh2 is a value prestored in control computer 11 and adjusted so as to allow extraction of the target area by a preliminary test and the like.

Control computer 11 creates an image I shown in FIG. 15(C), using image C shown in FIG. 15(A) and image F shown in FIG. 15(B). A pixel value i(x, y) of image I at the position (x, y) is set at "1" when c(x, y)=1 is satisfied or when c(x, y)=0 and f(x, y)=1 are satisfied, and is otherwise set at "0". In FIGS. 15(A) to (C), the pixels having the pixel value of "1" are indicated by white color and the pixels having the pixel value of "0" are indicated by black color.

Control computer 11 couples the pixels having the pixel value of "1" in image I and obtains a circumscribed quadrangle thereof. Control computer 11 calculates an average value of a lateral dimension H of the circumscribed quadrangle and a longitudinal dimension V of the circumscribed quadrangle as diameter D. Thereafter, the volume of the liquid droplet of the ink is calculated using the formula (1) or the formula (2), as described above.

(Modification)

The present invention is not limited to the above-described embodiment, and also includes, for example, a modification described below.

(1) Top Height

Although control computer 11 extracts the pixel (xp, yp) having maximum h(x, y) as the top and subtracts average height havg of the reference plane from height h(xp, yp), to thereby calculate top height hp in the above-described embodiment, the present invention is not limited thereto.

For example, control computer 11 may extract the pixel (xp, yp) having maximum h(x, y) as the top and subtract average height havg of the reference plane from an average value or a median value (median) of the pixel of the top and nearby pixels centered at the top, to thereby calculate top height hp. The size of the nearby pixels may be set at, for example, k (k≥3) pixels in the X direction and l (l≥3) pixels in the Y direction.

(2) Diameter D

Although control computer 11 uses the average value of H and V as diameter D in the above-described embodiment, the present invention is not limited thereto. Control computer 11 may use H as diameter D, or may use V as diameter D.

Vol calculated as described above is compared with a threshold value $T_v$, and when Vol<$T_v$ is satisfied, the ink is applied again. This operation is performed until Vol≥$T_v$ is satisfied. As a result, a prescribed ink volume can be ensured. However, when the number of times of application of the ink exceeds the specified number of times $N_v$, the process is suspended and an alarm buzzer is sounded to inform the operator.

The operator checks the applied portion through monitor 12. For example, two points on monitor 12 are specified with a mouse to measure diameter D of the applied ink, and when diameter D is larger than a prescribed value, the applied ink is completely removed using cutting laser device 4. Thereafter, the ink application operation is restarted again.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 microscopic application apparatus; 2 observation optical system; 2a observation lens barrel; 3 CCD camera; 4 cutting laser device; 5 ink application mechanism; 6 light source for ink curing; 7 liquid crystal color filter substrate; 8 Z stage; 9 X stage; 10 Y stage; 11 control computer; 12 monitor; 13 operation panel; 15 movable plate; 16 objective lens; 17 application unit; 18 application needle; 19 ink tank; 31 lens; 32 reference mirror; 33 beam splitter; 34 incident light source; 35 filter switching device; 36 filter; 37 half mirror; 38 image-forming lens; 39 Mirau-type interference objective lens.

The invention claimed is:

1. A method for measuring a volume of a micro projection, the method comprising:

obtaining, by a camera using white-light interferometry, images of the micro projection on a substrate via an interference objective lens by varying a height of the interference objective lens from the substrate such that the images are obtained at different heights of the interference objective lens from the substrate;

grouping pixels of the obtained images into sets of pixels such that each set of pixels includes one pixel, from each of the obtained images, that corresponds to a same position on an image-pick-up surface of the camera;

determining, for the sets of pixels, respective modulation contrasts of interference light reflected from the micro projection;

determining heights of the interference objective lens that correspond to peaks of the modulation contrasts;

identifying a lowest height and a highest height out of the determined heights of the interference objective lens;

identifying, from the obtained images, a height image that corresponds to an image obtained at the identified lowest height;

calculating a height of a reference plane based on the identified height image;

identifying, out of the sets of pixels, a first sets of pixels in which the peaks of the modulation contrasts occurred beyond the height of the reference plane as a projection top portion of the micro projection;

calculating a height of the extracted projection top portion of the micro projection based on the height of the reference plane and the identified highest height, the identified highest height corresponding to a top of the extracted projection top portion of the micro projection;

generating a first image in which the first sets of pixels having the peaks of the modulation contrasts that occurred beyond the height of the reference plane are identified;

generating a second image in which second sets of pixels having modulation contrast values that do not exceed a threshold modulation contrast value beyond the height of the reference plane are identified;

generating a third image in which third sets of pixels including the first sets of pixels and the second sets of pixels are identified;

identifying a diameter of a circumference of the third sets of pixels as a diameter of the extracted projection top portion of the micro projection; and calculating the volume of the micro projection based on the height and the diameter of the extracted projection top portion, wherein when the calculated volume of the micro projection is smaller than a threshold value, repeatedly applying a liquid material until a number of times of application exceeds a specified number of times.

2. The method according to claim 1, wherein the micro projection is a liquid droplet adhering to the substrate.

3. The method according to claim 2, wherein the liquid droplet is formed on the substrate by an application needle, an ink jet, or a dispenser.

\* \* \* \* \*